Feb. 6, 1962 M. C. AGENS 3,020,056
SEAL MATERIAL
Filed July 30, 1959
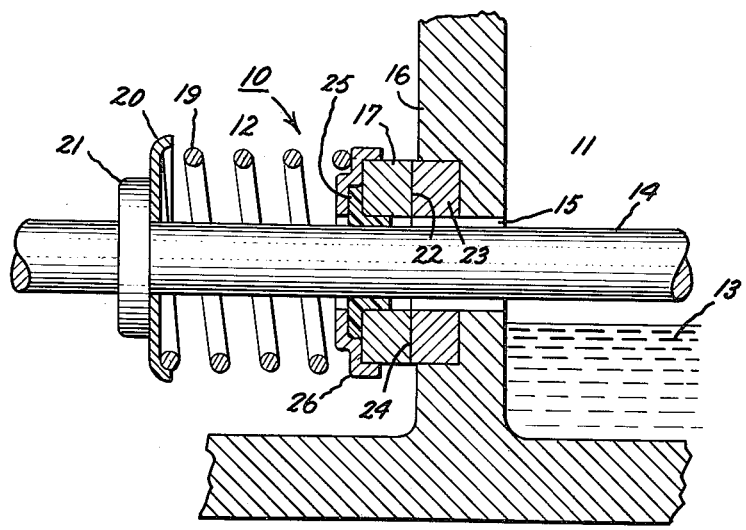
Inventor:
Maynard C. Agens,
by James J. Lichiello
His Attorney.

3,020,056
SEAL MATERIAL
Maynard C. Agens, Schenectady, N.Y., assignor to General Electric Company, a corporation of New York
Filed July 30, 1959, Ser. No. 830,484
5 Claims. (Cl. 277—237)

This invention relates to seal materials and more particularly to rotating seals employed in the presence of silicone oil.

The trend in various rotary apparatus, for example, steam turbines, gas turbines, pumps, and the like has been towards higher operating temperatures. In such apparatus, the well known rotary seal plays an important role, to be affixed to a rotary shaft, to seal, for example, compartments containing oils, gases, and the like. These seals must be of a material which is self-lubricating or which has a low coefficient friction. Alternately, such a material must depend upon external lubrication, for example, oil where the seal is used to seal off an oil supply. Together with the increase in operating temperatures of particular apparatus, for example, gas turbines, has been the trend towards new and different high temperature resistant lubricating oils. Among those oils which have found wide applications in high temperature equipment have been the well known silicone oils. It has been found, however, that the particular combination of the well known carbon seal together with or in the presence of silicone oil at high temperatures is incompatible, that the oil gels in the presence of carbon, therefore, jamming the seal and rendering it defective or inoperative.

Accordingly, it is an object of this invention to provide a novel seal material.

It is another object of this invention to provide a high temperature seal material.

It is another object of this invention to provide a high temperature seal material compatible with high temperature silicone oils.

The objects of my invention are accomplished by utilizing a seal material comprising, a base combination of Ag, silver, and $SnS_2$, stannic sulfide, together with an additional additive, such as $MoS_2$, molybdenum disulfide.

These and other features and advantages of this invention will be better understood when taken in connection with the following specification and the drawing in which:

The drawing illustrates a cross section of a typical rotary seal.

There has been an increasing need for a high temperature seal material to rub on a rotating shaft to keep fluids, such as oil, from leaking from one side under pressure. The seal material must meet certain criteria.

(1) It must be capable of running under dry or nearly dry conditions without damage to either the seal material or to the metal of the shaft.

(2) It must be capable of operating under partial lubrication without destructive effect on either the seal material or the fluid.

(3) It must be able to operate lubricated.

For the conventional lubricants in common use notably petroleum fluids and diesters, the most satisfactory material from all standpoints has been carbon. This material has a relatively low coefficient of friction, will run dry, can be lubricated adequately by all natural and most synthetic materials and presents a media for the incorporation of additives for the carbon, additives such as ester resins for improvement of high temperature lubricity and phenol containing materials to act as oxidation inhibitors. In manufacture, the finely divided carbon is mixed with pitch and pressed to a predetermined form. This form is fired in a kiln at 1200° C. under an atmosphere of inert gas. During this procedure most of the pitch is burned off and most of the acids and organic residues are lost in the vapor. The resulting product is hard, dense and generally machineable with common metal working tools. If it is desired to make a softer carbon another firing is made at temperatures as high as 2600° C. This drives off most ash, all organic residues and leaves a very pure synthetic graphite. This material is somewhat softer than the 1200° C. carbon and can be worked with common woodworking machine tools.

Experience with carbon brushes has indicated that under conditions where the carbon is unable to adsorb water vapor or other hydroxyl containing material, even carbon is a relatively poor lubricant. Thus for many medium and high temperature applications the resins which will fulfill this function are added to the carbon. In this way higher temperatures in the absence of available water vapor can be reached. These resins are generally added by vacuum impregnation and, depending on their viscosity and ability to permeate the carbon, may be from 40 mils to 1/8" deep. In addition to this type of filler, oxidation inhibitors are often incorporated. Since some of the carbons are asked to operate at 1300° F. and higher, the expected life can be greatly increased by the use of phenol containing resins. Those carbons which are impregnated with metals, notably silver and copper, must be mixed with such metals before the finely divided carbon and pitch mixture is compressed. High friction of the metal containing carbons limits their use.

The early work in lubrication of carbon on steel in the presence of silicones began in connection with carbon brush wear problem. Here it was found that vapors of silicones even in very minute quantities would increase the wear of the carbon brushes greatly. Under full submerged lubrication there were few problems but under partial or vapor conditions, silica, gelled silicones and carbon particles were always found. It has only been lately that large size carbon seals have been run with silicones but with poor results. All of the silicones, methyl, methyl phenyl and methyl chlorophenyl give the same results. During runs at temperatures above 500° F. with silicone oil there is a rapid darkening of the fluid, build up of gelled particles, and eventually, a blooming of a slurry of dark material surrounding the contacting surfaces of carbon and seal. Some of the carbons have worn very badly, others have shown little or no tendency to wear. Results of an analysis of this dark material indicated no appreciable carbon material present. The darkening is due entirely to gelled silicone fluid. Carefully controlled analytical determinations for carbon and hydrogen indicated that there was no more carbon in the dark, nearly gelled fluid than could be predicted in the silicone structure alone. Theoretically, this is not too difficult to understand. The end oxidation product of silicones is a soft gel. Oxidation is increased by the presence of a large catalytic surface area of the material capable of adsorbing oxygen. Carbons, and particularly porous carbons, present such a surface. During operation, carbons present active surfaces as soon as they are sheared, active surfaces capable of adsorbing oxygen and hydroxyl ions. These active surfaces are also catalytic to the oxidation of silicones.

Presently used rotary shaft seals in gas turbine engines are generally composed essentially of carbon which causes gelling of silicone oil at high temperature. The gelling of oil occurs in the clearance between the carbon seal and its mating disc and thus opens its seal and failure of shaft seals cannot be tolerated in high temperature, high speed rotary apparatus. An exemplary application of this invention is in well known shaft seals as illustrated in the drawing. Referring now to the drawing, there is shown, in section, a rotary seal 10 employed to provide a seal between chambers 11 and 12. Chamber 11 may be for example, an oil sump, pan, casing, etc. containing oil 13. The level of the oil 13 may rise to or above the seal, or may be thrown against the seal from gears running in the oil, or from gyration of vehicles such as aircraft for example. Briefly, the shaft of FIG. 1 rotates in opening 15 of wall 16. Therefore a rotating seal 17, an annulus of carbon, is concentrically positioned on shaft 14 and affixed thereto. Seal 17 is affixed to shaft 14 through a biasing spring 19 which in turn is affixed to shaft 14 by means of a retaining cup 20. Cup 20 is generally pressed on shaft 14, keyed therewith, or otherwise mounted for rotation with shaft 14. Cup 20 is also affixed to shaft 14 and prevented from axially sliding by suitable means, for example, shoulder 21. It can thus be seen from the drawing that the annulus of carbon 17 is rotated with shaft 14. In order to prevent oil and oil vapors from entering chamber 12, the carbon annulus 17 is provided with a smooth surface 22 which rubs against a suitable surface on wall 16 or, as illustrated, against an insert annulus 23 also provided with a smooth surface 24. Between shaft 14 and the carbon annulus 17, there is positioned a packing 25 acting as a seal between annulus 17 and shaft 14, and to be rotated with the carbon annulus 17. Packing 25 is generally of a soft material which makes good contact with shaft 14 and carbon annulus 17. A suitable washer 26 of a hard material, for example, metal, is positioned between spring 19 and packing 25 and bears against carbon annulus 17. Variations of washer configuration may be employed to provide good contact and/or compression of packing 25 while at the same time permitting spring 19 to bias the carbon annulus 17 against insert 23. The only means by which oil or oil vapor may enter chamber 12 is between the carbon annulus 17 and insert 23 at their rubbing surfaces 22 and 24. Gelling of the oil 13 at and between these surfaces provides a wedging action between annulus 17 and insert 23 permitting oil leakage. Such gelling occurs particularly at high temperature and with silicone oils. It has been discovered that compositions of Ag, $SnS_2$ and $MoS_2$ provide a seal material which has good lubricating characteristics when running dry and which is compatible at high temperatures with silicone oils to prevent gelling thereof.

Various modifications and configurations of rubbing seals reside in the art and are too numerous to mention. The common connecting link feature is that generally a pair of surfaces are provided one of which moves with respect to the other whether by rotation, reciprocation or combinations thereof, and thus rubbing action takes place therebetween. A typical example has been described with respect to a carbon seal rotating against a metal surface member. The seal need not be carbon nor the surface member metal. The surface member generally is metal, a metallic material or ceramic. The combination of materials is not as important as eliminating the carbon.

The particular problem of gelling does not exist to a great extent where the seal is employed with stationary parts, where no rubbing occurs or where the seal and oil temperatures are maintained at a fairly low level. Gelling, however, increases rapidly with temperature rise and is serious at temperatures about 350 to 500° F. and higher. While this invention provides an excellent seal for the general application of seals, it is more particularly adaptable to those seals operating in the presence of silicone or silicone containing oil. By presence of silicone oil it is meant that the seal is exposed both to silicone oil directly and to spray or vapor from the oil. Where the seal may operate in a submerged condition at all times, little gelling occurs.

EXAMPLE I

Briefly, a disc shaped seal with a ⅛″ wall is run on a steel, plated steel, or tungsten carbide surface at 3700 r.p.m.—(13,000 inches/min.) at 34.2 p.s.i. load under dry, partially lubricated and fully lubricated conditions, with air blasted against one side and oil fed to the other. Temperatures varied from ambient to 525° F. The material tested was a sintered silver-tin sulfide mixture 90.3 wt. percent silver—9.7 wt. percent tin sulfide machined in disc form and positioned on a high chrome steel plate. Mosaic gold is one preferred form of $SnS_2$. The seal material may be made by various methods. Best results were obtained when the materials were mixed in powder form and compressed under a 60,000 p.s.i. load at a temperature in the range of 200–400° C. The composite material remained integral after formation without need of a binder material. Surface finish of the plate was <5 microinches. The surface of the seal material was the best that could be obtained by polishing with 000 paper.

During operation with a tetrachlorophenyl methyl siloxane oil (the aforesaid tetrachlorophenyl methyl polysiloxane was a trimethylsiloxy chain-stopped methyl tetrachlorophenylpolysiloxane, the fluid containing approximately 2.001 total organic groups per silicon atom wherein 15 mol percent of the organic groups were silicon-bonded tetrachlorophenyl groups), initial friction was $\mu=.22$ dropping immediately to about $\mu=.16$. This was quite steady as $\mu$ varied for the first hour between .13 and .16. The temperature showed a tendency to level out at about 180° F.

The heating cycle was started at the end of one hour. By the time the temperature had reached 225° F., the friction dropped gradually until an average value of .065 was reached. Variation of $\mu$ was from .041 to .071. During the cooling cycle, the friction dropped to a low steady value of .041 rising very slightly until the temperature reached 215° F. when a sharp increase in friction to $\mu=.384$ was noticed. At this point, there was an abrupt rise in temperature to an equilibrium of about 250° F. At this point the friction dropped without application of heat to the .041 value. This became a self controlling mechanism, that is, as the friction dropped, the temperature dropped also. This caused the fluid to contract, present a dry state which allowed the friction to increase. This was followed by a temperature increase, expansion of the fluid and lubrication of the surfaces. Thus, a nearly steady state was developed. The heating cycle was started and the varying $\mu$ of .041–.071 was reached almost immediately. The steady .041 was again reached on the cooling cycle. The third heating cycle was a duplicate of the first two with one exception. The .041–.071 state was not reached immediately, requiring nearly 30 minutes running time to steady.

On disassembly, a very small amount of a high viscosity material was found on the outer edge of the track, the plate was not worn to a measurable degree but showed some evidence of oxidation and some slight sulfurization. Seal wear was .2 mil.

Although a certain amount of slightly cross-linked silicone was present, neither the physical form nor the amount present is likely to present a problem. The small amount that does occur is apparently washed out by new fluid as it is submerged.

EXAMPLE II

The apparatus of Example I was operated with another silicone oil (this silicone oil was a trimethylsiloxy chain-stopped methyl phenylpolysiloxane containing about 2.001 total methyl and phenyl groups per silicon atom and having about 15 mol percent silicon-bonded phenyl groups). Starting friction was considerably higher than that obtained in Example I ($\mu=.329$) and the temperature leveled at 225° F. No drop in friction due to run in could be noticed. The heating cycle was started. At 250° F. the coefficient of friction dropped to .041 and remained at this point until 25 minutes of running at 500° F. At this point, an abrupt increase in friction to an average $\mu$ value of .287 with variation from .205 to .31 occurred. This high friction continued through the high temperature portion of the run. During the cooling cycle there was a slight upward trend in the coefficient of friction with the variations becoming less as the temperature rose. During the second heating cycle, there was again a drop in coefficient friction to about .18. The friction rose after a few moments operation and remained in the .2 to .3 range for the rest of the test.

On disassembly, there was a very slight amount of higher viscosity fluid on the outer race of the track. Otherwise the fluid was essentially unchanged. There was no seal wear or wear on the metal plate. There was a brownish cast on the inner half of the seal ring and it appeared that this particular combination had sealed the system nearly completely and that operation after the initial low friction run was under a partially lubricated condition.

Further examples of the sealing material made in accordance with this invention are included in the following table:

*Table I*

| Rotating Material | Stationary Material | R.p.m. Speed | Kg. Load | Coefficient of Friction | Rotating Part, Wear |
|---|---|---|---|---|---|
| Ag-SnS$_2$, 79.9 and 20.1% by wt | Steel | 1,800<br>3,500<br>3,500<br>3,500 | 7<br>5<br>7<br>17 | .078<br>.13-.16<br>.087<br>.043-.056 | Negligible.<br>Do. |
| Do | Oxidized Steel | 3,500<br>3,500 | 5<br>10 | .063<br>.063 | Do. |
| Do | Chromium Plate | 2,400<br>2,400<br>2,400 | 5<br>7<br>10 | .105<br>.105<br>.084 | Do. |
| Do | Hard Steel | 3,500 | 5 | .084-.1 | Do. |
| Ag-SnS$_2$-MoS$_2$, 80%, 4% and 16%, by wt. | Chromium Plate | 3,500<br>3,500 | 5<br>5<br>(500° F.) | .152-.177<br>.046-.063 | Increased in thickness. |
| Do | Hard Steel | 3,500 | 5 | .105 | |
| Ag-SnS$_2$-MoS$_2$, 80.5, 13.8 and 5.7% by wt. | do | 3,500<br>3,500 | 5<br>5<br>(500° F.) | .093-.127<br>.105-.127 | Increased in thickness and wt. |

A further seal of 72–28 wt. percent of Ag-SnS$_2$ also gave good results.

Where the seal material is to operate dry or in the presence of silicone vapors only, MoS$_2$ is added to provide a dry lubricant. When adding MoS$_2$, it has been found that it should be added in coarse form, average particle size of about 45 micron. Particle sizes considerably less than 45 micron render the material objectionable for mechanical reasons. One preferred composition containing MoS$_2$ is a composite of about 68.5 wt. percent Ag, 24.8 wt. percent SnS$_2$ and 6.7 wt. percent of MoS$_2$. Such a material provided good lubrication characteristics, good sealing characteristics and was compatible with silicone vapors and oil.

A further combination of about 95.3 wt. percent Ag, 1.3 wt. percent SnS$_2$ and 3.4 wt. percent of MoS$_2$ also provided a low friction and little wear and with no gelling of oil at about 500° F. The excellent lubricating characteristics of MoS$_2$ and SnS$_2$ combinations have been adequately described in copending application, S.N. 830,482, Oliver et al., filed concurrently herewith and assigned to the same assignee as the present invention, now abandoned, and continuation-in-part application Serial No. 19,978, Oliver et al.

Preferred ranges of constituents have been discovered to be about 70–96 wt. percent of Ag, 1.3–24 wt. percent SnS$_2$ and 1.4–4 wt. percent MoS$_2$.

The silicone oils as described may vary over a wide range of viscosities without detrimental effects to the seal. In Examples I and II, the oil viscosity was about 58 centistokes measured at about 100° F.

It may be seen that this invention provides a seal material, comprising silver and stannic sulfide together with a lubricant additive, such as MoS$_2$, to provide a new and improved seal which is compatible at high temperatures with silicone oils and vapors and having good lubricating characteristics for rubbing applications.

Additional examples of organopolysiloxane fluids ("i.e. silicone oils") which can be employed in the practice of the present invention are found in U.S. Patents 2,469,888, 2,469,890, 2,689,859 and 2,599,844.

While modifications of this invention and variations thereof which may be employed in the scope of the invention have not been described, the invention is intended to include all such as may be embraced within the following claims.

What I claim as new and desire to secure by Letters Patent of the United States is:

1. A seal body adapted to engage a surface element with rubbing contact therebetween to provide a fluid seal, said body comprising a mixture of Ag and SnS$_2$.

2. A seal body adapted to engage a surface element with rubbing contact therebetween to provide a fluid seal for high temperature silicone oil, said body comprising a mixture of Ag and SnS$_2$.

3. The invention as recited in claim 2 wherein said Ag comprises at least about 70% by weight of said body.

4. The invention as recited in claim 2 wherein said body comprises, Ag, SnS$_2$ and MoS$_2$.

5. The invention as recited in claim 4 wherein said Ag comprises about 70–96 wt. percent, 1.3–24 wt. percent SnS$_2$ and 1.4–4 wt. percent MoS$_2$.

References Cited in the file of this patent

UNITED STATES PATENTS

| | | |
|---|---|---|
| 2,046,724 | Buffington | July 7, 1936 |
| 2,149,974 | McCormack | Mar. 7, 1939 |
| 2,272,526 | Keeron | Feb. 10, 1942 |
| 2,853,323 | Engelking | Sept. 23, 1958 |